Figure 1:
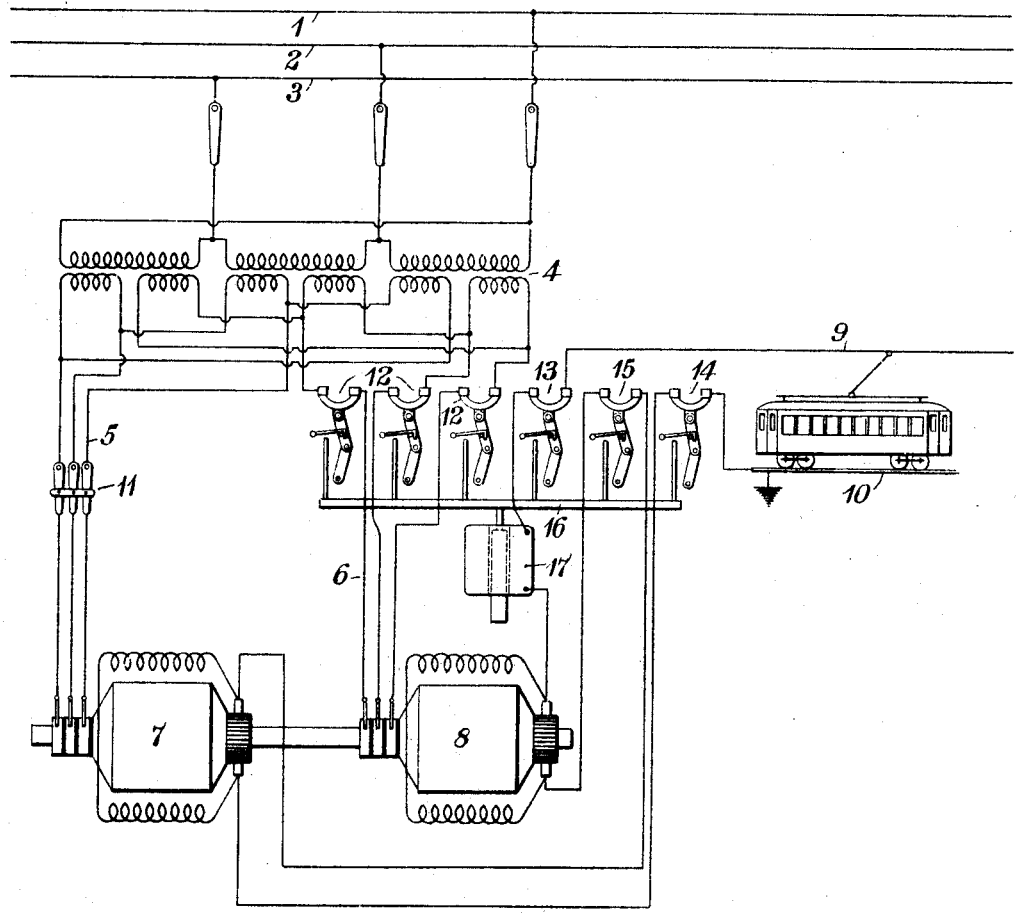

P. M. LINCOLN.
SYSTEM OF DISTRIBUTION.
APPLICATION FILED FEB. 3, 1910.

977,645.

Patented Dec. 6, 1910.
2 SHEETS—SHEET 1.

WITNESSES:
C. L. Belcher
Otto S. Schauer

INVENTOR
Paul M. Lincoln
BY
ATTORNEY

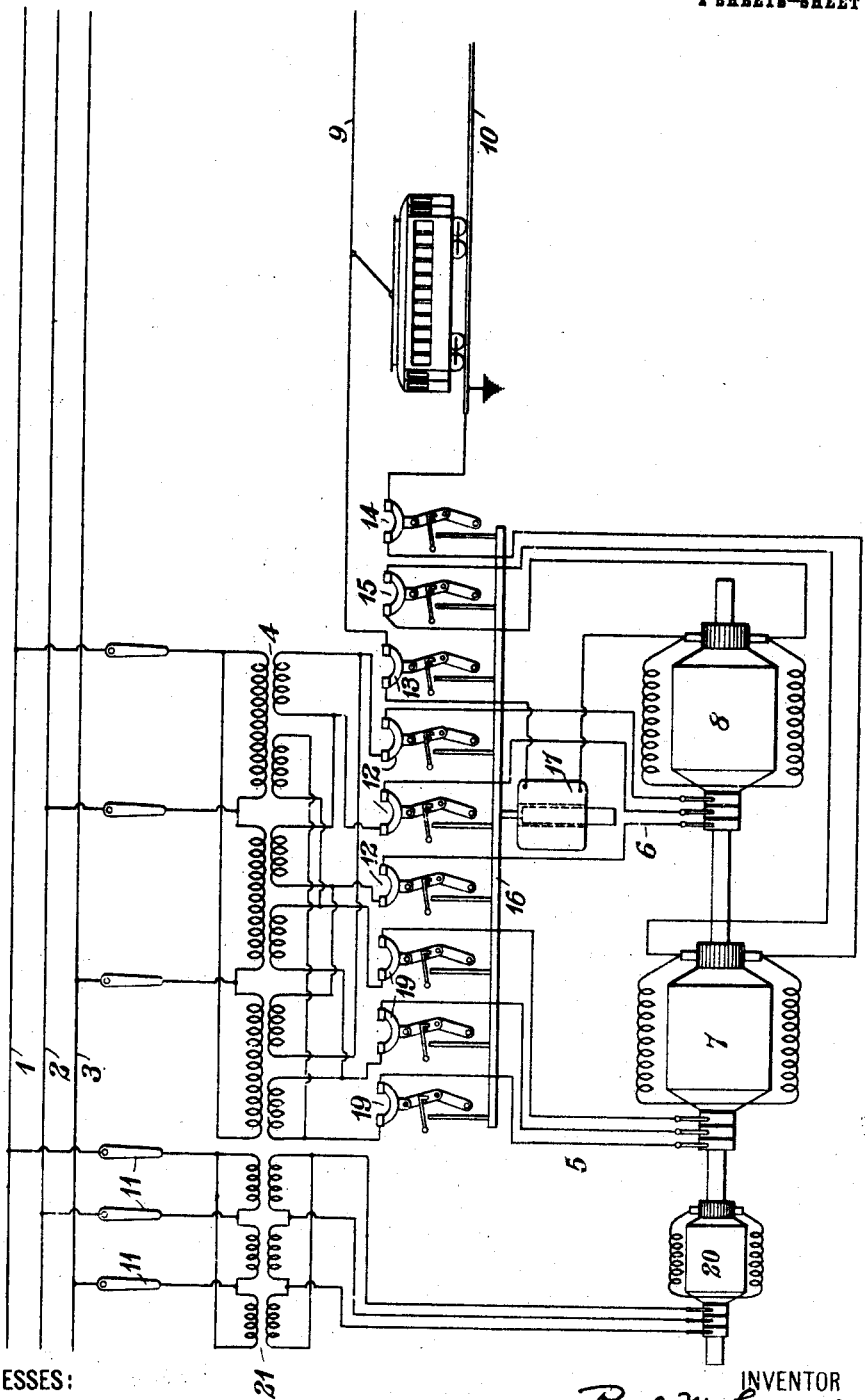

UNITED STATES PATENT OFFICE.

PAUL M. LINCOLN, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM OF DISTRIBUTION.

977,645.

Specification of Letters Patent.

Patented Dec. 6, 1910.

Application filed February 3, 1910. Serial No. 541,752.

*To all whom it may concern:*

Be it known that I, PAUL M. LINCOLN, a citizen of the United States, and a resident of Pittsburg, in the county of Allegheny and State of Pennsylvania, have invented a new and useful Improvement in Systems of Distribution, of which the following is a specification.

My invention relates to systems of electrical distribution in which rotary converters are employed, and it has for its object to provide a system in which rotary converters may be safely utilized for supplying direct current at a high voltage, and in such a manner that they will not be thrown out of synchronism upon the occurrence of short circuits on the direct current side of the system.

Direct current railway systems are now frequently supplied with much higher voltages than have heretofore been customary, the voltages at present being often as high as 1200. If, however, rotary converters are employed in the distributing circuits of such high-voltage systems, there is much danger of their being damaged or ruined by short circuits upon the direct current sides because the high voltage tends to maintain the flashes or arcs at the commutators which usually result from the short circuits. In order to reduce the voltage at the commutators of rotary converters in such systems, I propose to mechanically couple two rotary converters and to connect them in series to the direct current circuit, and, further, to so arrange the system that a short circuit will cause disconnection of both converters from the direct current circuit, and only one of them from the alternating current circuit, leaving the other connected thereto for the purpose of continuing the operation of both machines at synchronous speed. It is, accordingly, only necessary to re-connect both of the machines to the direct current circuit, and one of them to the alternating current circuit, in order to resume full operation, after a temporary suspension resulting from abnormal circuit conditions.

Figures 1 and 2 of the accompanying drawings illustrate, diagrammatically, two systems of distribution that embody my invention.

In Fig. 1, alternating current is supplied from a polyphase circuit 1—2—3, through suitable transformers 4 and two independent sets of connections 5 and 6, to two rotary converters 7 and 8, respectively, the armatures of which are mounted upon the same shaft, or are otherwise mechanically coupled, and are connected in series relation to a direct current circuit, such as a trolley system comprising a trolley conductor 9 and a track rail 10 that is grounded. Any suitable means may be employed in the set of connections 5, such as switches 11, for connecting the rotary converter 7 to, and disconnecting it from, the transformer 4, while circuit breakers 12 are employed in the set of connections 6 for governing the connections of the rotary converter 8 to the transformers 4. Circuit breakers 13 and 14 are interposed in the connections of the converters 7 and 8 to the direct current circuit 9—10, and a third circuit breaker 15 is interposed in the series connection between the converters 7 and 8. A common tripping device 16 is employed for all of the circuit breakers 12, 13, 14 and 15, or some other means may be employed, if desired, for effecting simultaneous opening thereof. The device 16 is operated by means of an electromagnet 17, that is included in the direct current circuit of the converters, and is adapted to effect operation of the tripping mechanism upon the occurrence of a short circuit, an overload, or other predetermined condition in the direct current circuit 9—10.

It will be readily seen, from the above description, that, upon the occurrence of a short circuit, or any other predetermined condition, in the direct current circuit 9—10, all of the circuit breakers 12, 13, 14 and 15 are caused to open, with the result that the converter 8, which is most directly connected to the ungrounded conductor 9 of the direct current circuit, is disconnected by means of the circuit breaker 12 from the alternating current circuit. The connections of both converters with the direct current circuit are also severed, as well as the connection between the converters. The converter 7, however, remains connected to the transformer 4, and will maintain synchronous speed of both of the converters, since they are mechanically coupled. As the converter 7 generates only one-half of the direct current voltage, the voltage at its commutator will be insufficient to maintain the flash or arc that may occur at its commutator as the result of the abnormal condition of the direct current circuit which caused opening of the circuit breakers. In order, therefore, to resume full operation, it is only necessary to close the circuit breakers 12, 13, 14 and 15, as the converters are both still operating at synchronous speed.

In the system of Fig. 2, circuit breakers 19 are included in the connections 5 of the converter 7 to the transformers 4 and are arranged to be operated simultaneously with, and similarly to, the remaining circuit breakers, so that, upon the occurrence of a short circuit, both converters are completely disconnected from both the direct and alternating current circuits. The two converters are maintained in operation at synchronous speed, however, by means of a comparatively small synchronous motor 20, the armature of which is mechanically coupled to the armatures of the converters and is connected to the source of alternating current independently of the converters. For the sake of simplicity of illustration, the motor 20 is shown connected to transformers 21, but, of course, it will be understood it might also be supplied from the same transformers as supply the converters.

I claim as my invention:

1. In a system of distribution, the combination with an alternating current circuit, a direct current circuit, and two mechanically coupled rotary converters that are connected in series relation to the direct current circuit and are independently connected to the alternating current circuit, of circuit breakers in the connections of one converter to the alternating current circuit, circuit breakers in the connections of the converters to the direct current circuit, and means for effecting simultaneous opening of all of the said circuit breakers.

2. In a system of distribution, the combination with an alternating current circuit, a direct current circuit, and two mechanically coupled rotary converters that are connected in series relation to the direct current circuit and are independently connected to the alternating current circuit, of circuit breakers in the connections of one converter to the alternating current circuit, circuit breakers in the connections of the converters to the direct current circuit, and means for effecting simultaneous opening of all of the said circuit breakers upon the occurrence of predetermined conditions in the direct current circuit.

3. In a system of distribution, the combination with an alternating current circuit, a direct current circuit, and two mechanically coupled rotary converters that are connected in series relation to the direct current circuit and are independently connected to the alternating current circuit, of circuit breakers in the connections of one converter to the alternating current circuit, circuit breakers in the connections of both converters to the direct current circuit, a circuit breaker in the connection between the converters, and means for effecting simultaneous opening of all of said circuit breakers.

4. In a system of distribution, the combination with an alternating current circuit, a direct current circuit, and two mechanically coupled rotary converters that are connected in series relation to the direct current circuit and are independently connected to the alternating current circuit, of circuit breakers in the connections of one converter to the alternating current circuit, circuit breakers in the connections of the converters to the direct current circuit, a circuit breaker in the connection between the converters, and means for effecting simultaneous opening of all of the said circuit breakers upon the occurrence of predetermined conditions in the direct current circuit.

5. In a system of distribution, the combination with an alternating current circuit, a direct current circuit having one side grounded, and two mechanically coupled rotary converters that are connected in series relation to the direct current circuit and are independently connected to the alternating current circuit, of circuit breakers in the alternating current circuit connections of the converter that is connected most directly to the ungrounded side of the direct current circuit, circuit breakers in the connections of the converters to the direct current circuit, and means for effecting simultaneous opening of all of said circuit breakers.

6. In a system of distribution, the combination with a direct current circuit, an alternating current circuit, and two mechanically coupled rotary converters that are connected to both of said circuits, of means for effecting simultaneous disconnection of both converters from the direct current circuit, and of only one of them from the alternating current circuit.

7. In a system of distribution, the combination with a direct current circuit, an alternating current circuit, and two mechanically coupled rotary converters that are connected to both of said circuits, of means for effecting simultaneous disconnection of both converters from the direct current circuit, and of only one of them from the alternating current circuit, upon the occurrence of predetermined conditions in the direct current circuit.

8. In a system of distribution, the combination with a direct current circuit, an alternating current circuit, and a plurality of mechanically coupled synchronous machines connected to said circuits, of means for simultaneously severing all connections of the machines to the direct current circuit and the connections of all but one of the machines to the alternating current circuit.

9. In a system of distribution, the combination with a direct current circuit, an alternating current circuit, and a plurality of mechanically coupled synchronous machines connected to said circuits, of means for simultaneously severing all connections of the machines to the direct current circuit and the connections of all but one of the machines to the alternating current circuit upon the occurrence of predetermined conditions in the direct current circuit.

In testimony whereof, I have hereunto subscribed my name this 26th day of Jan., 1910.

PAUL M. LINCOLN.

Witnesses:
H. N. HUSSEY,
B. B. HINES.